US008346429B2

(12) United States Patent
Nwadiogbu et al.

(10) Patent No.: US 8,346,429 B2
(45) Date of Patent: Jan. 1, 2013

(54) VEHICLE HEALTH MONITORING SYSTEM ARCHITECTURE FOR DIAGNOSTICS AND PROGNOSTICS DISCLOSURE

(75) Inventors: Emmanuel Obiesie Nwadiogbu, Scottsdale, AZ (US); Dinkar Mylaraswamy, Fridley, MN (US); Sunil Menon, Scottsdale, AZ (US); Harold C. Voges, Shoreview, MN (US); George Hadden, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 863 days.

(21) Appl. No.: 12/183,793

(22) Filed: Jul. 31, 2008

(65) Prior Publication Data

US 2009/0138141 A1 May 28, 2009

Related U.S. Application Data

(60) Provisional application No. 60/990,195, filed on Nov. 26, 2007.

(51) Int. Cl.
*G01M 17/00* (2006.01)

(52) U.S. Cl. .......................................... 701/31.4; 701/3

(58) Field of Classification Search ..................... 701/29
See application file for complete search history.

(56) References Cited

U.S. PATENT DOCUMENTS

| | | | |
|---|---|---|---|
| 6,434,512 | B1 | 8/2002 | Discenzo |
| 6,757,668 | B1 | 6/2004 | Goebel et al. |
| 6,766,230 | B1 | 7/2004 | Rizzoni et al. |
| 6,879,893 | B2 | 4/2005 | Woodard et al. |
| 6,928,345 | B2 | 8/2005 | Quinn |
| 7,260,501 | B2 | 8/2007 | Pattipatti et al. |
| 2004/0176885 | A1 | 9/2004 | Quinn |
| 2004/0176887 | A1 | 9/2004 | Kent et al. |
| 2006/0064291 | A1 | 3/2006 | Pattipatti et al. |

FOREIGN PATENT DOCUMENTS

| | | | |
|---|---|---|---|
| EP | 1455313 | A1 | 9/2004 |
| EP | 1630633 | A2 | 3/2006 |

OTHER PUBLICATIONS

Sun, Q.; Sensor Fusion for Vehicle Health Monitoring and Degradation Detection, Information Fusion, 2002, Proceedings of the Fifth International Conference Jul. 8-11, 2002.
Followell, D et al.; Implications of an Open System Approach to Vehicle Health Management, Aerospace Conference, 2004, Proceeding 2004 IEEE, Mar. 6, 2004.

(Continued)

*Primary Examiner* — Eric Culbreth
(74) *Attorney, Agent, or Firm* — Ingrassia Fisher & Lorenz, P.C.

(57) ABSTRACT

A health monitoring system for a vehicle system includes an operational support system including a plurality of managers and a decision support module. Each manager corresponds to a different sub-system of the vehicle system, and comprises a plurality of reasoners and a fusion block. Each reasoner is configured to obtain data and provide preliminary output regarding a different component of the sub-system based on the data. The fusion block is coupled to the plurality of reasoners, and is configured to receive the preliminary output and generating manager output based on the preliminary output. The decision support module is coupled to the plurality of managers, and is configured to receive the manager output and provide a decision support output based on the manager output.

11 Claims, 5 Drawing Sheets

OTHER PUBLICATIONS

Roemer, M.J. et al.; An Overview of Selected Prognostic Technologies With Reference to an Integrated PHM Architecture, Proceedings of the First International Forum on Integrated System Health Engineering and Management in Aerospace, Nov. 7, 2005.

EP Search Report , EP 08169702.1-1229/2063399 dated Apr. 28, 2010.

EP Search Report, EP 08169685 dated Apr. 22, 2010.

USPTO Office Action for U.S. Appl. No. 12/192,630; Notification date Dec. 07, 2011.

Altas et al.; An Evolvable Tri-Reasoner IVHM System The Boeing Company 1999.

Thomas C. Clutz; A Framework for Prognostics Reasoning; Dissertation, Dec. 2002.

VEHICLE HEALTH MONITORING SYSTEM ARCHITECTURE FOR DIAGNOSTICS AND PROGNOSTICS DISCLOSURE

CROSS-REFERENCE TO RELATED APPLICATION

This application claims the benefit of U.S. Provisional Application No. 60/990,195, filed Nov. 26, 2007.

TECHNICAL FIELD

The operational health of a vehicle system needs to be monitored and predicted to insure the vehicle is available to perform its required functions at any point in time. Such a vehicle comprises major operational systems, the major operational systems comprising subsystems, components and sensors. The present invention generally relates to health monitoring systems for such vehicles and, more particularly, to an architecture for health monitoring systems for performing diagnostics and prognostics on vehicles.

One embodiment of such a vehicle is an aircraft whose major operational system examples are its propulsion system, its environment control system, its landing system, its flight control system, its ground proximity monitoring system etc. These major operational systems within the aircraft comprise operational subsystems. One embodiment of a subsystem for a propulsion system is its fuel control subsystem. Another embodiment of its subsystem is the lubrication subsystem. Each of the subsystems comprises components and sensors.

The vehicle subsystem operational behavior at all operating times and conditions result in the successful contribution of the major operational system to the mission goals of the vehicle. Therefore the subsystems and component operational health contribute to the operational behavior of the vehicle. The present invention is a hierarchical architecture for vehicle health monitoring systems for performing diagnostics and prognostics on such vehicles.

BACKGROUND

Vehicle health monitoring systems are often used to monitor various health characteristics of vehicles. Such operational health characteristics of the vehicles are further decomposed to the health characteristics of its major operational systems and subsystems. For example, when a vehicle is not currently in use, a health monitoring system may obtain and assemble data regarding prior operation of the vehicle, along with other data, in order to provide support for an operator or other individual for use in making decisions regarding future maintenance, operation, or use of the vehicle system, and/or for use in making other decisions. The same operational data is stored in databases for use in monitoring the operational reliability and maintenance history of the vehicle subsystems and usually feedback to OEM engineering for use in improving the reliability of the vehicle systems design. However, such health monitoring systems often have a support system or architecture that was developed on an ad hoc basis Such architectures may not provide optimal and streamlined support for diagnostics and prognostics pertaining to the vehicle that a hierarchal architecture discussed here would provide.

Accordingly, it is desirable to provide a vehicle health monitoring system having an improved support structure or architecture and connected to the reliability and maintenance databases. It is further desirable to provide program products for vehicle health monitoring program products with an improved support structure or architecture. It is also desirable to provide computer systems for vehicle health monitoring system having programs with an improved support structure or architecture. Furthermore, other desirable features and characteristics of the present invention will become apparent from the subsequent detailed description of the invention and the appended claims, taken in conjunction with the accompanying Appendix and this background of the invention.

Furthermore, other desirable features and characteristics of the present invention will become apparent from the subsequent detailed description of the invention and the appended claims, taken in conjunction with the accompanying Appendix and this background of the invention.

BRIEF SUMMARY OF THE INVENTION

In accordance with an exemplary embodiment of the present invention, a hierarchical architecture for monitoring, providing diagnosis and predicting the operational health of a vehicle system is provided. The health monitoring system comprises a health management and operational support system comprising a plurality of major system health managers and a vehicle system decision support module.

Each of the plurality of health managers corresponds to a major operational vehicle system. Each of the plurality of managers comprises a plurality of subsystem reasoners and a fusion block. Each subsystem reasoner corresponds to a subsystem of the major operational system of the vehicle.

The plurality of reasoners are preferably hierarchically connected to the corresponding manager of the vehicle major system. Each of the plurality of subsystem reasoners is preferably configured to obtain fault monitoring results from a plurality of component health monitoring algorithms that monitor the health and trend, the signal outputs of the components operating as components of the plurality of subsystems. Each subsystem reasoner preferably receives information on the reliability, operational life and operational maintenance history of the vehicle subsystem including history of such subsystems in the fleet.

A subsystem fusion block is coupled to the plurality of reasoners. Algorithms operate on the subsystem and component data. Output from the algorithms are preferably connected to the subsystem fusion block. Each algorithm is designed to determine faults in the subsystem or subsystem component using failure signatures and representations of the subsystem and/or component failure behaviors. Each reasoner preferably contains a plurality of algorithms for providing diagnosis and prognosis of a subsystem, component or component operational behavior within the subsystem. The reasoner also preferably obtains operational reliability, operational life and operational maintenance history of the subsystem and/or component.

The vehicle major system decision support module is coupled to the plurality of managers. The decision support module is configured to receive the manager outputs from the plurality of managers and provide a decision support output for the major vehicle system based at least in part on the managers outputs. The decision support is also preferably connected to a database containing the vehicle maintenance manuals and technical support manuals. The decision support module output preferably provides directions to the maintainer on recommended repair action based on fault conditions reported by the major operational system health managers.

In accordance with another exemplary embodiment of the present invention, a program software product for performing health monitoring, diagnostics and predictive maintenance on a vehicle system is provided. The program software product comprises a program and a computer-readable signal-bearing media. The program software product is configured to at least facilitate performing the monitoring, diagnostics and predictive health maintenance on the vehicle system. The program software product preferably implements the hierarchically configured architecture of a plurality of sensor data, algorithms, reasoners, managers, and a decision support module for the health monitoring, diagnosis and predictive health maintenance of each major system of the vehicle. The program software product preferably comprises a vehicle decision support module, the vehicle major system managers, and a plurality of reasoners hierarchically connected to each major system manager. The program software product preferably implements the hierarchically configured plurality of reasoners for each subsystem that comprise a major system of the vehicle. Each of the plurality of subsystem reasoners is preferably configured to integrate algorithms that are designed to monitor the operational health condition, provide diagnosis, and predictive monitoring of the subsystem and at least one component of the plurality of components of a subsystem that comprise the major vehicle system.

In a preferred embodiment, each of the health managers corresponds to a different major system of the vehicle. Each of the plurality of managers comprises a plurality of reasoners and a fusion block. Each of the plurality of reasoners is preferably configured to at least facilitate obtaining results from algorithms and providing output regarding the operational health of the subsystem or operational health of a component of the sub-system based at least in part on the operational data from sensors of the vehicle system and historical data maintained in databases. The databases are preferably hosted at the manufacturing or operational facility and contain the maintenance history and reliability of the component or subsystem. The database preferably contains fleet data for all operators. The fusion block is coupled to the plurality of reasoners. The fusion block is configured to at least facilitate receiving the preliminary output and generating manager output based at least in part on the preliminary output. The decision support module is coupled to the plurality of managers. The decision support module is configured to at least facilitate receiving the manager output from the plurality of managers and providing a decision support output based at least in part on the manager output. The computer-readable signal-bearing media bears the program.

In accordance with a further exemplary embodiment of the present invention, a computer system for performing health monitoring, diagnostics and predictive health management on a vehicle system is provided. The computer system comprises a processor, a memory, and a program. The memory is coupled to the processor. The program resides in the memory, and is configured to be executed by the processor. The program is configured to at least facilitate performing the health monitoring, diagnostics and predictive health management on the vehicle system. The program comprises a plurality of managers and a decision support module. Each of the plurality of managers corresponds to a different major system of the vehicle. Each of the plurality of managers comprises a plurality of reasoners and a fusion block. Each of the plurality of reasoners is configured to at least facilitate obtaining results from algorithms and providing output regarding the operational health of the subsystem or operational health of a component of the sub-system based at least in part on the operational data from sensors of the vehicle. The fusion block is coupled to the plurality of reasoners. The fusion block is configured to at least facilitate receiving the preliminary output and generating manager output based at least in part on the preliminary output. The decision support module is coupled to the plurality of managers. The decision support module is configured to at least facilitate receiving the manager output from the plurality of managers and providing a decision support output based at least in part on the manager output.

In accordance with a further exemplary embodiment of the present invention, a computer system for performing health monitoring, diagnostics and predictive health management on a vehicle system is provided. The computer system is located on-board the vehicle or on a ground-based system. The computer system can be located in part on-board and in-part on the ground-based system. The computer system comprises a processor or processors, a memory or memories, and a program or programs. The memory is coupled to the processor. The program resides in the memory, and is configured to be executed by the processor. The program is configured to at least facilitate performing the health monitoring, diagnostics and predictive health management on the vehicle system. The program comprises a plurality of managers and a decision support module. Each of the plurality of managers corresponds to a different major system of the vehicle. Each of the plurality of managers comprises a plurality of reasoners and a fusion block. Each of the plurality of reasoners is configured to at least facilitate obtaining results from algorithms and providing output regarding the operational health of the subsystem or operational health of a component of the sub-system based at least in part on the operational data from sensors of the vehicle. The fusion block is coupled to the plurality of reasoners. The fusion block is configured to at least facilitate receiving the preliminary output and generating manager output based at least in part on the preliminary output. The decision support module is coupled to the plurality of managers. The decision support module is configured to at least facilitate receiving the manager output from the plurality of managers and providing a decision support output based at least in part on the manager output.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
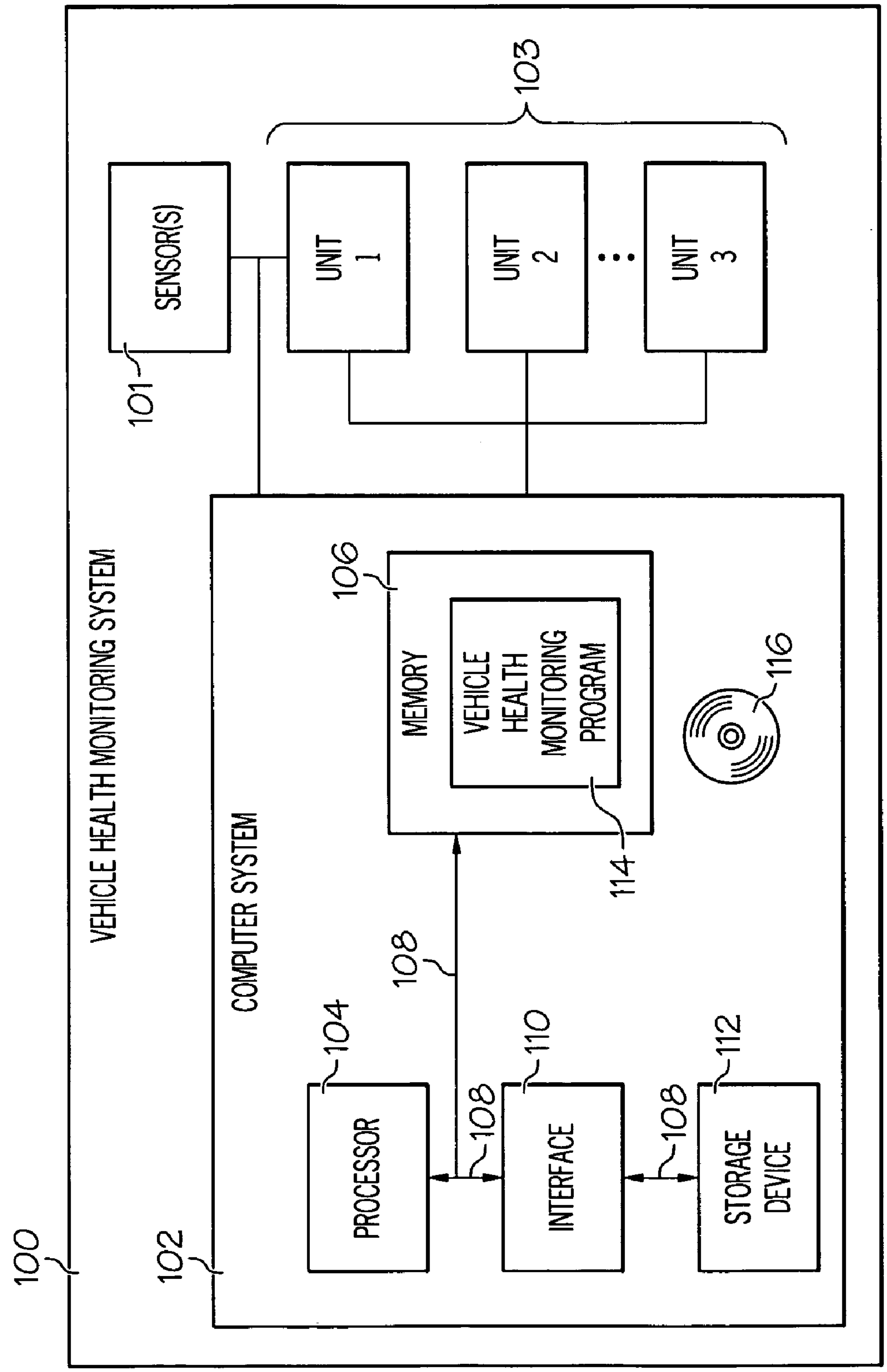
FIG. 1 is a functional block drawing of a vehicle health monitoring system embedded on a computer system, in accordance with an exemplary embodiment of the present invention.

FIG. 1 is a functional block drawing of a vehicle health monitoring system 100, in accordance with an exemplary embodiment of the present invention. In the depicted embodiment, the vehicle health monitoring system 100 includes one or more sensors 101, a computer system 102 and a plurality of additional units 103. However, this may vary in other embodiments.

The one or more sensors 101 are preferably coupled to the vehicle and/or one or more components or systems thereof. The sensors 101 preferably at least facilitate generation of engine data pertaining to operation of the engine and/or one or more systems and/or sub-systems of the vehicle, to assist in performing diagnostics and health monitoring of one or more systems and/or sub-systems of the vehicles. The sensors 101 are preferably coupled to the computer system 102 and the additional units 103. However, this may vary in other embodiments.

As depicted in FIG. 1, the computer system 102 includes a processor 104, a memory 106, a computer bus 108, a computer interface 110, and a storage device 112. The processor 104 performs the computation and control functions of the computer system 102, and may comprise any type of processor 104 or multiple processors 104, single integrated circuits such as a microprocessor, or any suitable number of integrated circuit devices and/or circuit boards working in cooperation to accomplish the functions of a processing unit.

During operation, the processor 104 executes one or more vehicle health monitoring programs 114 preferably stored within the memory 106 and, as such, controls the general operation of the computer system 102. Such one or more vehicle health monitoring programs 114 are preferably coupled with a computer-readable signal bearing media bearing the product. For example, in certain exemplary embodiments, one or more program products may include an operational support system and architecture, such as the exemplary operational support system and architecture depicted in FIG. 2 and described further below in connection therewith in accordance with an exemplary embodiment of the present invention. Such program products may reside in and/or be utilized in connection with any one or more different types of computer systems 102, which can be located in a central location or dispersed and coupled via an Internet or various other different types of networks or other communications. In certain other exemplary embodiments, one or more program products may be used to implement an operational support system and architecture, such as the exemplary operational support system and architecture depicted in FIG. 2 and described further below in connection therewith in accordance with an exemplary embodiment of the present invention. For example, in certain such exemplary embodiments, the one or more program products may be used to operate the various components of the vehicle health monitoring system 100, to connect such components, or to control or run various steps pertaining thereto in order to facilitate processes for supporting decision-making with respect to the vehicle system, based on various data and output such as that described in greater detail above.

The memory 106 stores one or more vehicle health monitoring programs 114 that at least facilitates conducting health monitoring one or more systems of a vehicle and/or facilitating operation of the vehicle health monitoring system 100 and/or various components thereof, such as those described above. The memory 106 can be any type of suitable memory. This would include the various types of dynamic random access memory (DRAM) such as SDRAM, the various types of static RAM (SRAM), and the various types of non-volatile memory (PROM, EPROM, and flash). It should be understood that the memory 106 may be a single type of memory component, or it may be composed of many different types of memory components. In addition, the memory 106 and the processor 104 may be distributed across several different computers that collectively comprise the computer system 102. For example, a portion of the memory 106 may reside on a computer within a particular apparatus or process, and another portion may reside on a remote computer.

The computer bus 108 serves to transmit programs, data, status and other information or signals between the various components of the computer system 102. The computer bus 108 can be any suitable physical or logical means of connecting computer systems 102 and components. This includes, but is not limited to, direct hard-wired connections, fiber optics, and infrared and wireless bus technologies.

The computer interface 110 allows communication to the computer system 102, for example from a system operator and/or another computer system, and can be implemented using any suitable method and apparatus. It can include one or more network interfaces to communicate to other systems or components, one or more terminal interfaces to communicate with technicians, and one or more storage interfaces to connect to storage apparatuses such as the storage device 112.

The storage device 112 can be any suitable type of storage apparatus, including direct access storage devices 112 such as hard disk drives, flash systems, floppy disk drives and optical disk drives. In one exemplary embodiment, the storage device 112 is a program product from which memory 106 can receive a vehicle health monitoring program 114 that at least facilitates performing vehicle health monitoring on a system of a vehicle, or that facilitates operation of the vehicle health monitoring system 100 or components thereof. The storage device 112 can comprise a disk drive device that uses disks 116 to store data. As one exemplary implementation, the computer system 102 may also utilize an Internet website, for example for providing or maintaining data or performing operations thereon.

It will be appreciated that while this exemplary embodiment is described in the context of a fully functioning computer system 102, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks, and transmission media such as digital and analog communication links.

The additional units 103 are coupled to the computer system 102, and/or are coupled to one another, for example as depicted in FIG. 1. The additional units 103 may comprise any number of different types of systems, devices, and/or units. For example, in certain embodiments, the additional units 103 may comprise one or more additional computer systems and/or components thereof, one or more sensors for determining values pertaining to the vehicle and/or the health and/or operation thereof, and/or one or more transmitters and/or receiver for transmitting, exchanging, and/or receiving information from non-depicted internal and/or external sources pertaining to the vehicle and/or the health and/or operation thereof. In various other embodiments, any number of other different types of additional units 103 may be used. Likewise, in certain embodiments, additional units 103 may not be necessary for the vehicle health monitoring system 100 of FIG. 1.

Figure 2:
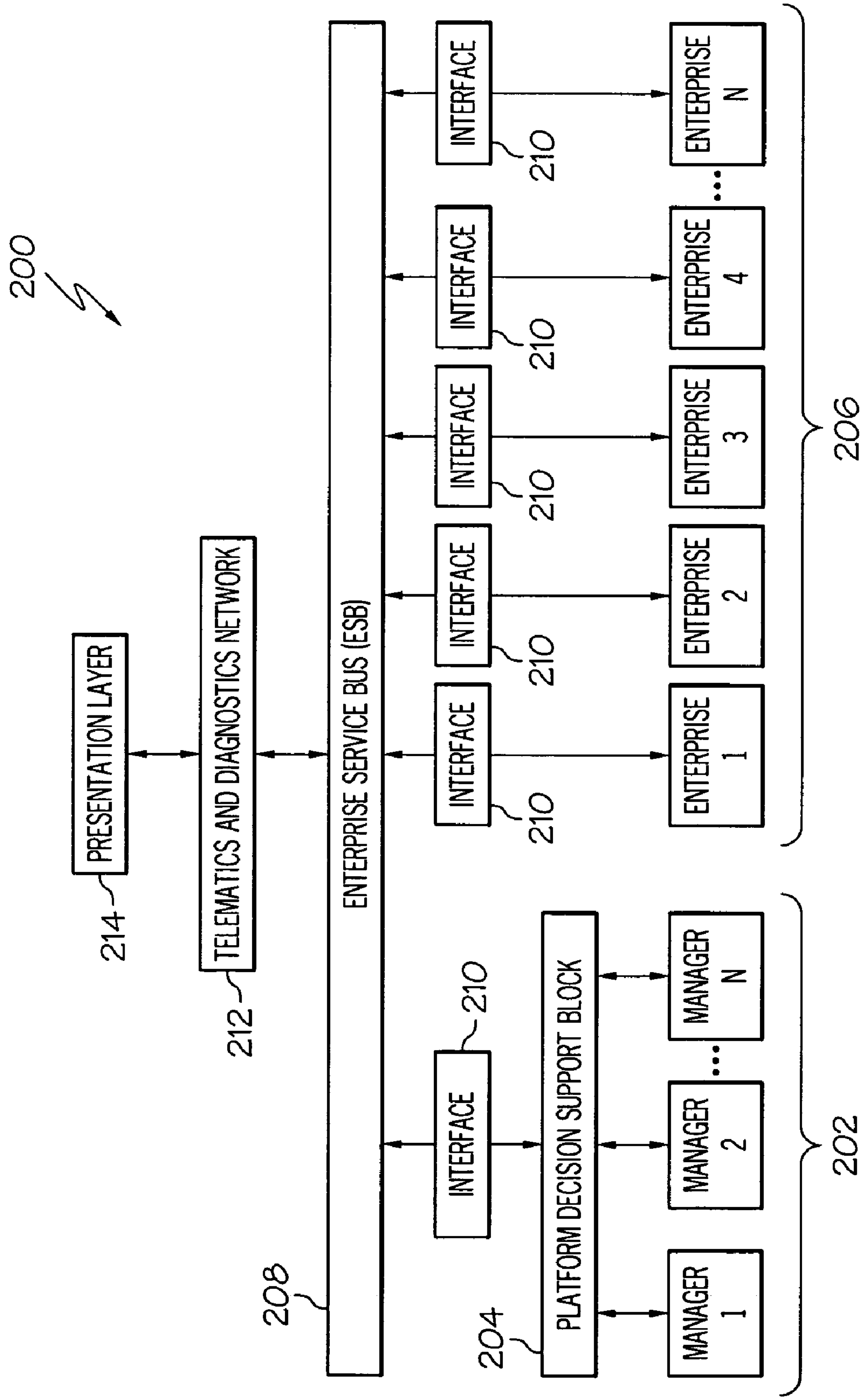
FIG. 2 is a functional block diagram of an operational support system for a health monitoring system of a vehicle or a program, program product, or computer system thereof, that includes a plurality of managers, a decision support block, a plurality of enterprises, an enterprise service bus, a plurality of interfaces, a telematics and diagnostics network, and a presentation layer, and that can be used in connection with the computer system of FIG. 1 and/or a program stored in memory thereof, in accordance with an exemplary embodiment of the present invention.

FIG. 2 is a functional block diagram of an operational support system or architecture 200 and accompanying architecture for a vehicle health monitoring system or a vehicle health monitoring program, program product, or computer system thereof, such as the vehicle health monitoring system 100, the computer system 102, and the vehicle health monitoring program 114 of FIG. 1. The operational support system 200 may also be implemented in connection with other devices, systems, and/or units in various other embodiments.

In one preferred embodiment, the vehicle health monitoring system 100 can be used in connection with an aircraft or a fleet of aircraft. In another embodiment, the vehicle health monitoring system 100 can be used in connection with an automobile or a fleet of automobiles. In yet another embodiment, the vehicle health monitoring system 100 can be used in connection with a locomotive or a fleet of locomotives. In other embodiments, the vehicle health monitoring system 100 can be used in connection with various other different types of vehicles or vehicle systems and/or combinations of any of these and/or other different types of vehicles and/or vehicle systems As depicted in FIG. 2, the operational support system or architecture 200 comprises an operational support module comprising a plurality of managers 202, a decision support module 204, a plurality of enterprises 206, an enterprise service bus 208, a plurality of interfaces 210, a telematics and diagnostics network 212, and a presentation layer 214.

Each of the managers 202 pertains to a particular subsystem of the vehicle system. For example, in one preferred embodiment of the operational support system 200 depicted in FIG. 4, the plurality of managers 202 comprises an aircraft propulsion diagnostics and prognostics manager, an aircraft engine control system diagnostics and prognostics manager, an aircraft auxiliary power unit diagnostics and prognostics manager, and an aircraft fault model (for example, pertaining to a flight management system, flight control actuators, landing systems, and the like). Similarly, in automobiles, the plurality of managers 202 may pertain to certain analogous sub-systems, such as automobile air conditioning, and/or various other sub-systems. It will be appreciated that in other embodiments, various other managers 202 may be utilized for various different types of vehicle systems.

Preferably, each manager 202 pertains to a vehicle subsystem related to operation of the vehicle system. Each manager 202 monitors and reports the health of the sub-system in its purview. Specifically, each manager 202 is configured to at least facilitate generating, and is preferably configured to generate, manager output pertaining to the sub-system based at least in part on a preliminary output. Furthermore, each of the plurality of managers 202 is configured to conduct analysis on engine data pertaining to the applicable vehicle subsystem to thereby generate manager 202 output for use in support in decision-making regarding the vehicle system.

In addition, each of the plurality of managers 202 is configured to at least facilitate conducting manager 202 analysis based at least in part on preliminary output and generating the manager 202 output based at least in part on the manager 202 analysis. Also in a preferred embodiment, such analysis is conducted by a fusion block 304 of the manager 202 that is coupled to reasoners of the same manager 202. As will be described in greater detail below, in a preferred embodiment the preliminary output is generated by sub-components of each manager 202, most preferably a plurality of reasoners and a fusion block for each manager 202, as depicted in FIG. 3 and described below in connection therewith.

Figure 3:
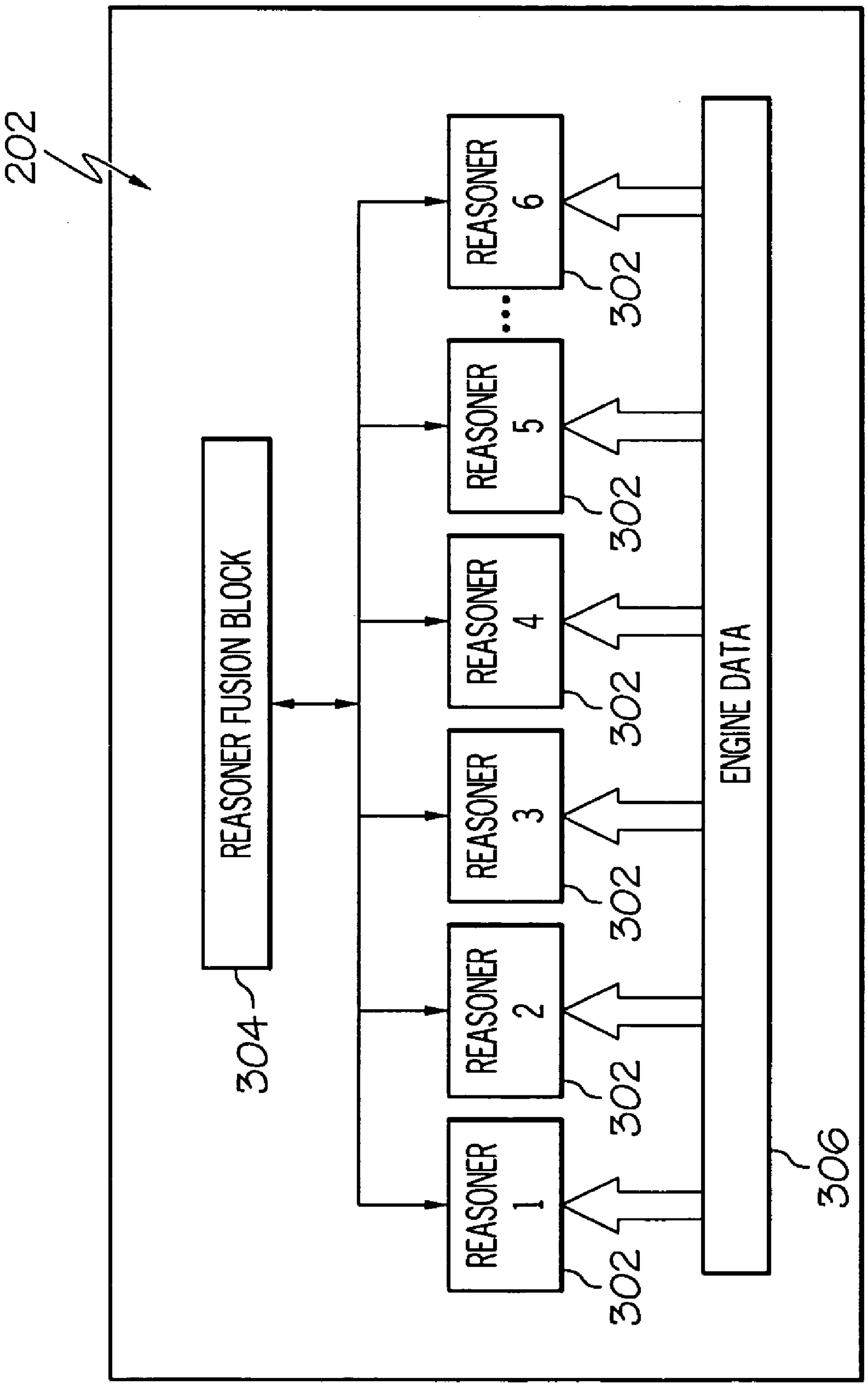
FIG. 3 is a functional block diagram of an exemplary manager of the operational support system of FIG. 2, that includes a plurality of reasoners and a reasoner fusion block, in accordance with an exemplary embodiment of the present invention.

FIG. 3 is a functional block diagram of an exemplary manager 202 of the operational support system 200 of FIG. 2, in accordance with an exemplary embodiment of the present invention. As depicted in FIG. 3, each manager 202 includes a plurality of reasoners 302 and a fusion block 304. Each reasoner 302 pertains to a different component or group of components of the sub-system corresponding to a respective manager 202 of which the particular reasoner 302 part of or coupled thereto.

Each of the plurality of reasoners 302 is configured to at least facilitate obtaining engine data 306 regarding a different component of the sub-system. For example, in certain embodiments, each reasoner 302 may receive the engine data 306 from the computer system 102 of FIG. 2, from one or more of the sensors 101 and/or the additional units 103 of FIG. 1, and/or from one or more other, non-depicted sources within or external to the vehicle health monitoring system 100 of FIG. 1. In a preferred embodiment, each of the plurality of reasoners 302 is further configured to at least facilitate conducting reasoner 302 analysis based at least in part on the engine data 306, to thereby generate reasoner 302 output (also referred to herein as preliminary output) based on the engine data 306 and the reasoner 302 analysis thereof.

Also in a preferred embodiment, each reasoner 302 comprises an algorithm or set of algorithms whose information is combined to represent the health of the group of components pertaining thereto. Each reasoner 302 comprises one or more specific methods or algorithms that process engine data 306, which may include sensor data and/or other forms of data, to the generate reasoner 302 output as to a quantitative indication of the health of one or more components of the specific sub-system. The methods can be based on techniques such as neural networks, principal component analysis, techniques based on fault tree analysis, document to knowledge capture, model residuals, built-in tests, built-in test equipment output, data driven techniques, and self-organizing feature maps, among other possible techniques. The multiple methods/algorithms, if they exist, are preferably combined/fused in the fusion block 304.

The fusion block 304 can be a simple approach such as using voting, or it could be based on more sophisticated approaches such as using Dempster-Schafer, Bayesian or fuzzy logic. For example, in one exemplary embodiment, a fuel system reasoner 302 includes several algorithms, such as a residual-based approach, a heuristics-based approach, and a bit/bite integration approach. Each algorithm is designed to use different data and a different knowledge base (for example, including models, experience, sensor data, and design data) to assess the health of the sub-system. In this way, the confidence of the accuracy of the combined reasoner 302 output is increased because its conclusion was reached using different data and knowledge sources. One advantage of this approach is that as new algorithms are developed, they can be added to the system architecture with low risk to the remaining system.

Preferably each reasoner 302 obtains engine data 306 pertaining to the one or more components of the sub-system to which the reasoner 302 pertains. In a preferred embodiment, the engine data 306 pertains to operational data for the aircraft or other vehicle system, such as engine operational data. Also in a preferred embodiment, the engine data 306 may be obtained via sensors on the aircraft or other vehicle system, for example from the sensors 101 and/or the additional units 103 of FIG. 1, and/or from any number of other different types of devices via any number of different techniques and systems. The type of engine data 306 preferably varies based on the particular module. In addition, the type of engine data 306 may vary in different embodiments of the present invention. By way of example only, the engine data 306 may be obtained continuously while the vehicle system is in use (for example, while an aircraft is in flight). Alternatively, the engine data 306 may be obtained in bunches or packets while the vehicle system is in use (for example, while an aircraft is in flight). Still in other embodiments, the engine data 306 may be obtained after the vehicle system has been in use (for example, while an aircraft is on the ground in between flights and/or other uses of the applicable vehicle system).

The engine data 306 is preferably received by each of the reasoners 302 of each of the managers 202. The reasoners 302 then analyze the engine data 306 pertaining to a component or group of components corresponding to a vehicle sub-system corresponding to the manager 202 to which the particular reasoner 302 belongs, to thereby generate a reasoner 302 output for each reasoner 302, which is provided to the fusion block 304 for the manager 202 to which the reasoner 302 belongs.

The fusion block 304 for each manager 202 receives the reasoner 302 output and/or other data from each of the reasoners 302 of the particular manager 202. The fusion block 304 for each manager 202 produces the above-referenced manager 202 output based on the analysis. Specifically, the fusion block 304 is coupled to the plurality of reasoners 302, and is configured to at least facilitate receiving the preliminary output, conducting analysis thereon, and generating the manager 202 output based at least in part on the preliminary output generated by the reasoners 302.

Specifically, in a preferred embodiment, the reasoner 302 output from each of the reasoners 302 for such manager 202 is then aggregated and further analyzed within such manager 202, preferably in the fusion block 304 for such manager 202, which generates manager 202 output based thereon. The reasoner 302 output thus can be considered to be a preliminary output, and hence will be referenced as such at various points throughout this application.

In one exemplary embodiment of a propulsion system manager 202 in an aircraft, such a propulsion system may include a lube system reasoner, a fuel system reasoner, a performance trending reasoner, a rotating component reasoner, a startup roll-down reasoner, and a life usage reasoner, for example as shown in an exemplary embodiment of the present invention depicted in FIG. 5 and described further below in connection therewith. In various embodiments, such a propulsion system manager 202 may include a different combination of these and/or other reasoners 302. In addition, in various embodiments, the various other managers 202 similarly include a plurality of reasoners 302. Preferably, each such manager 202 pertains to a different sub-system of the vehicle system, and each reasoner 302 of each manager 202 pertains to a different group of components of the subsystem for the corresponding manager 202 to which the reasoner 302 belongs.

The decision support module 204 is coupled to each of the plurality of managers 202, and receives the manager 202 output therefrom. In addition, the decision support module 204 performs analysis on the manager 202 output, and generates decision support output. In a preferred embodiment, the decision support output is transmitted via one or more interfaces 210 to the enterprise service bus 208. The enterprise service bus 208 then transmits the decision support output to the telematics and diagnostics network 212, which in turn transmits the decision support output to the presentation layer 214. Ultimately, an operator or other user can view the decision support output via the presentation layer 214. The operator or other user can then make various decisions pertaining to the vehicle system, based on the decision support output.

In a preferred embodiment, the decision support module 204 comprises a support block that fuses the outputs of the different diagnostics and prognostics managers 202 and presents an overall system health status and fault diagnosis/prognosis. The decision support module 204 combines relevant information from the managers 202 to present specific system health information that would not have been present in the output of any single manager 202. For example, in an exemplary embodiment of the present invention in which the vehicle health monitoring system 100 pertains to an environmental control system (ECS) of an aircraft, performance issues in the propulsion engine can affect the ECS system operation. Therefore, the platform decision support block may highlight propulsion system issues and ignore reported ECS system issues because these are due to propulsion system effects. Similar effects may also be possible for other sub-systems of an aircraft and/or for various sub-systems of other different types of vehicle systems. Similar techniques may also be implemented in connection with other systems and/or sub-systems of the aircraft or other vehicle or fleet thereof.

Specifically, in a preferred embodiment, the decision support module 204 is coupled to each of the plurality of managers 202, and is configured to (i) receive the manager output from the plurality of managers 202, and (ii) provide a decision support output based at least in part on the manager output. The decision support module 204 is also preferably configured to at least facilitate performing decision support analysis based at least in part on the manager 202 output and generating the decision support output based at least in part on the decision support analysis.

In addition, in a preferred embodiment, the decision support module 204 combines relevant information that may reside in different information systems such as the reliability and maintainability system and repair and overhaul information system via an enterprise service bus 208. In this way, historical records of faults relevant to the system of interest, for example, can be considered when coming up with a determination of a fault diagnosis/prognosis. In addition, stored data from acceptance test procedures (ATP) can be used to establish a baseline system performance metric for calibrating the managers 202.

Moreover, in certain preferred embodiments, the vehicle health monitoring system 100 includes a plurality of enterprises 206 that are coupled to the enterprise service bus 208 via one or more interfaces 210. For example, in one preferred exemplary embodiment of the present invention depicted in FIG. 4 and described further below in connection therewith, the plurality of enterprises 206 includes a reliability/maintenance enterprise 206, a repair/overhaul enterprise 206, a database enterprise 206, a technical manual database enterprise 206 (for example, such as an IETM, or integrated electronic technical manual, database enterprise 206). In various embodiments, a different combination of these and/or other enterprises 206 may be included. Each of the enterprises 206 is coupled to the enterprise service bus 208, and transmits and receives information using the enterprise service bus 208 and the interfaces 210.

Each of the plurality of enterprises 206 is configured to generate an enterprise output based at least in part on data received from one or more non-depicted sources. For example, in certain embodiments, such data may pertain to a particular function of the enterprise 206, and may be stored in memory or in a program stored in memory or in a program product, for example as described above in connection with the exemplary computer system 102 of FIG. 1. However, this may vary in other embodiments. In such embodiments having a plurality of enterprises 206, the decision support module 204 is further configured to at least facilitate receiving the enterprise output from at least one of the plurality of enterprises and performing the decision support analysis also based at least in part on the enterprise output.

For example, in one preferred embodiment, the enterprises 206 include or have access to data that is useful for the decision support module 204 in its analysis. The enterprises 206 transmit such useful data to the decision support module 204 at least in part via the enterprise service bus 208. The decision support module 204 can then utilize this data in its analysis. The enterprises 206 may similarly transmit data to the managers 202, for example to the reasoners 302 included therein, for use in processing and/or analysis.

In addition, in certain embodiments, the enterprises 206 may receive data and various types of output (such as those referenced above) from the platform decision block and/or the plurality of managers 202, which can then be used to update the data accessed by and/or stored within the enterprises 206. In a preferred embodiment, such data and output can be transmitted in various directions via the enterprise service bus 208 and various interfaces 210 coupled thereto. In addition, various data may also be transferred between the various enterprises 206, preferably also via the enterprise service bus 208 and various interfaces 210 coupled thereto.

Also in a preferred embodiment, the enterprise service bus 208 is coupled to the plurality of enterprises 206 and to the decision support module 204, and is configured to at least facilitate flow of enterprise output to the decision support module 204 and to receive the decision support output (for example, based on enterprise 206 analysis of data pertaining to the one or more functions of each enterprise 206) from the decision support module 204. Also in a preferred embodiment, the enterprise service bus 208 is further configured to at least facilitate flow of the decision support output to the telematics and diagnostics network 212 and ultimately to the presentation layer 214.

The plurality of interfaces 210 are coupled to the enterprise service bus 208, the decision support module 204, and the plurality of enterprises 206. The plurality of interfaces 210 are configured to at least facilitate flow of the decision support output to the enterprise service bus 208 and ultimately to the telematics and diagnostics network 212 and the presentation layer 214, as well as flow of the enterprise 206 output to the enterprise service bus 208 and/or ultimately to the decision support module 204 and/or to the plurality of managers 202. However, this may vary in other embodiments.

Also in a preferred embodiment, the telematics and diagnostics network 212 is coupled to the enterprise service bus 208, and is configured to receive the decision support output therefrom and provide the decision support output to the presentation layer 214. It will be appreciated that the telematics and diagnostics network 212 may comprise a computer network and/or one or more various other types of diagnostic networks and/or other networks to perform this function.

In addition, also in a preferred embodiment, the presentation layer 214 is coupled to the diagnostic network, and is configured to receive the decision support output therefrom and to present the decision support output for a user of the vehicle health monitoring system 100 of FIG. 1 and/or an operator of the vehicle for which the vehicle health monitoring system 100 and the operational support system 200 is being implemented or used. For example, in certain embodiments, the presentation layer 214 may include a liquid crystal (LCD) display, another type of computer display, and/or any one of a number of different types of displays, user interfaces, and/or presentation layers in which decision support output can be presented to such a user of the vehicle health monitoring system 100 of FIG. 1 and/or an operator of the vehicle for which the vehicle health monitoring system 100 and the operational support system 200 is being implemented or used. For example, the presentation layer 214 may provide the user with such decision support output for example pertaining to recommendations for operation, maintenance, and/or usage of an aircraft or a fleet of aircraft, and/or other information to facilitate such decision-making by the user, in addition to various other different potential types of decision support output.

In one preferred embodiment, a vehicle health monitoring system 100 for a fleet comprising at least one vehicle system comprises an architecture comprising a plurality of managers 202 and at least one decision support module 204, such as the architecture 200 depicted in FIG. 2. Each of the plurality of managers 202 corresponds to at least one sub-system of the vehicle system, and comprises a plurality of reasoners 302 and a fusion block 304. In one embodiment, each of the plurality of managers 202 is a diagnostics and prognostics manager 202. Each of the plurality of managers 202 may also include an additional sub-system fusion block 304 coupled to the plurality of reasoners 302 and configured to receive output therefrom, to perform analysis thereon, and to generate output based on the analysis. The fusion block 304 is coupled to each of the plurality of reasoners 302 for the manager 202, and is configured to receive the reasoner 302 output from each of the plurality of reasoners 302 for the manager 202, to perform analysis on the reasoner 302 output, and to generate a manager 202 output, based on the analysis on the reasoner 302 output.

Also in one preferred embodiment, each of the plurality of reasoners 302 corresponds to a component of the sub-system, and is configured to receive operational data pertaining to the component, to perform analysis on the operational data, and to generate a reasoner 302 output, based on the analysis on the operational data.

The decision support module is coupled to each of the plurality of managers 202 and preferably also to at least one enterprise 206 function. The decision support module is configured to receive the manager 202 output from each of the plurality of managers 202, to receive outputs from enterprise 206 functions such as reliability, maintainability, repair and overhaul, technical manuals, finance, logistics, and/or other enterprise 206 functions, to perform analysis on one or more of foresaid outputs, and to provide a decision support output based on the analysis, for example to a vehicle and fleet maintenance crew.

Figure 4:
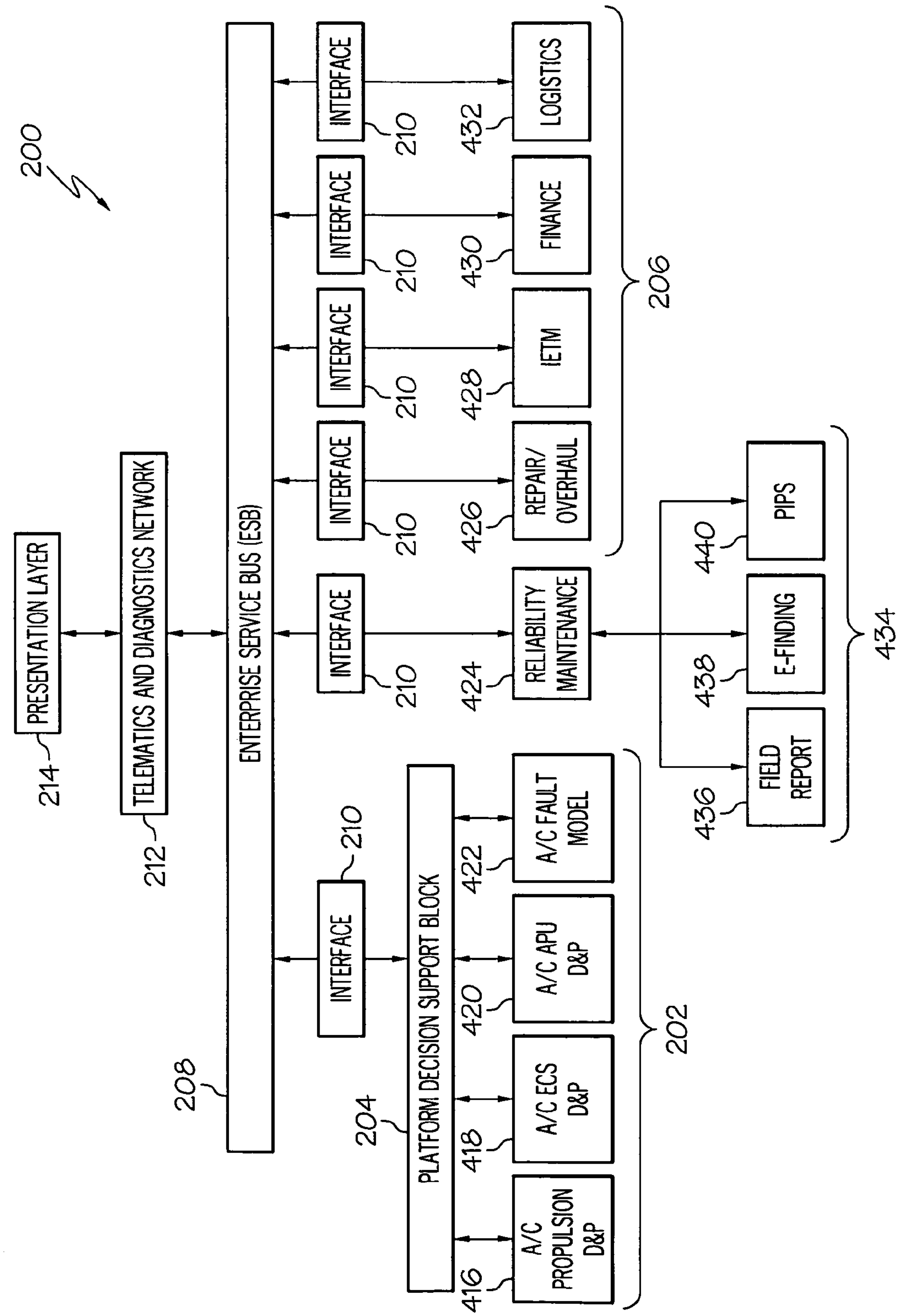
FIG. 4 is a functional block diagram of an exemplary embodiment of the operational support system of FIG. 2, that includes exemplary specific managers and enterprises, in accordance with an exemplary embodiment of the present invention.

FIG. 4 is a functional block diagram of an exemplary embodiment of the operational support system 200 of FIG. 2, that includes exemplary specific managers 202 and enterprises 206, in accordance with an exemplary embodiment of the present invention. In the depicted embodiment, the plurality of managers 202 comprises an aircraft propulsion diagnostics and prognostics manager 416, an aircraft engine control system diagnostics and prognostics manager 418, an aircraft auxiliary power unit diagnostics and prognostics manager 420, and an aircraft fault model 422 (for example, pertaining to a flight management system, flight control actuators, landing systems, and the like). It will be appreciated that in other embodiments, various other managers 202 may be utilized for various different types of vehicle systems.

Also in the depicted embodiment, the plurality of enterprises 206 comprises a repair and overhaul enterprise 426, an interactive electronic technical manual (IETM) enterprise 428, a finance enterprise 430, and a logistics enterprise 432. However, this may vary, and various other enterprises 206 may be utilized in connection with the vehicle health monitoring system 100 and the operational support system 200 of FIGS. 1 and 2 instead of or in addition to the enterprises 206 depicted in FIG. 4 in various other embodiments of the present invention.

In addition, as is also depicted in FIG. 4, in a preferred embodiment the operational support system 200 may also include a reliability and maintenance module 424. The reliability and maintenance module 424 gathers data pertaining to reliability and maintenance issues for the aircraft and/or for the fleet, for example from various field reports 436, electronic findings 438, and/or from PIPS data and/or other data sources and/or methods. The reliability and maintenance module 424 generates reliability and maintenance output based on this data, for analysis by and use by the decision support module 204 in generating the decision support output. The reliability and maintenance module is preferably coupled to the decision support module 204 via the interfaces 210 and the enterprise service bus 208, which transmit the reliability and maintenance output to the decision support module 204. However, this may also vary in other embodiments.

Figure 5:
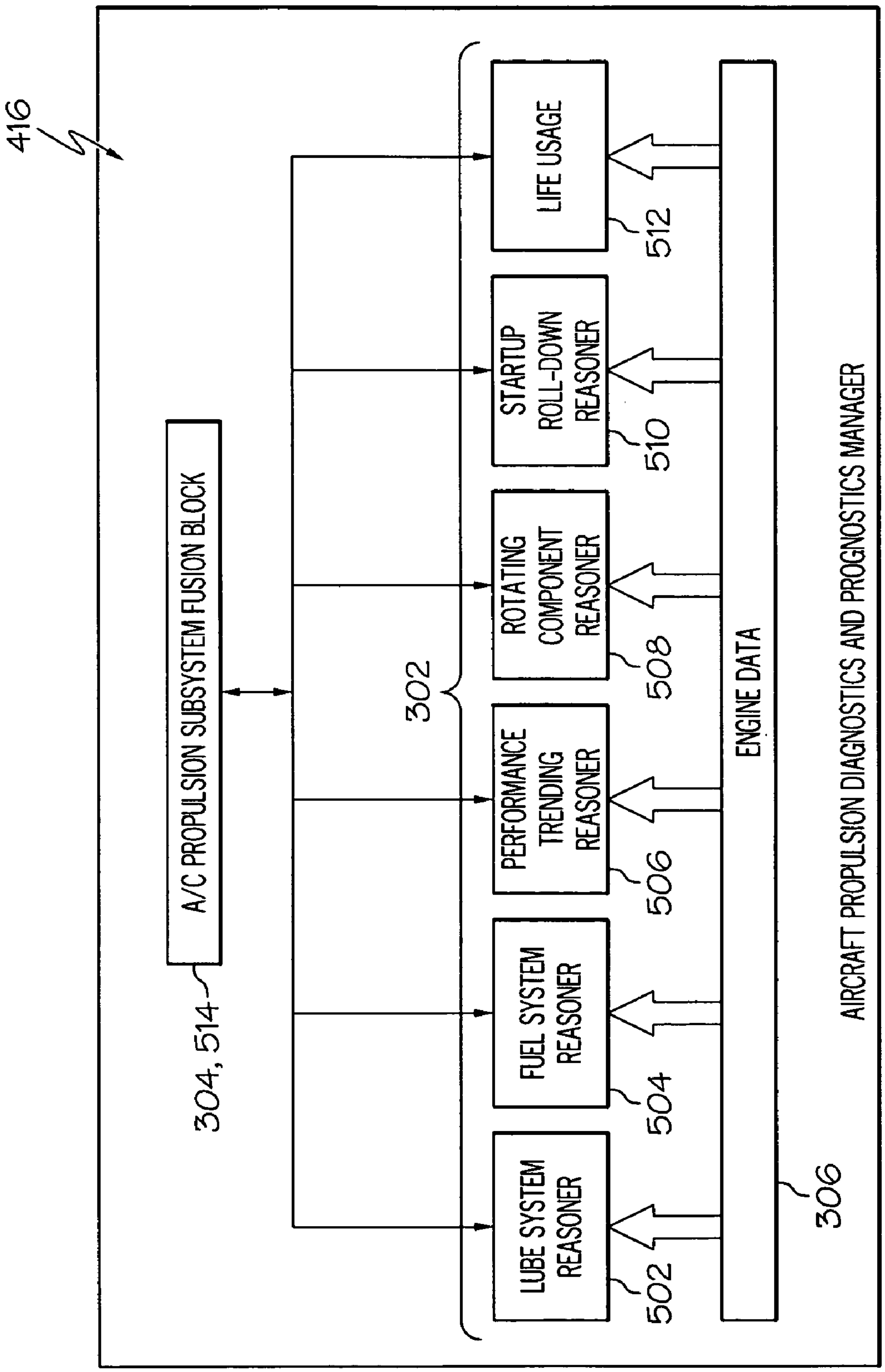
FIG. 5 is a functional block diagram of an exemplary embodiment of one of the managers of FIG. 4, that includes exemplary specific reasoners, in accordance with an exemplary embodiment of the present invention.

FIG. 5 is a functional block diagram of an exemplary embodiment of one of the managers 202 of FIG. 3, that includes exemplary specific reasoners 302, in accordance with an exemplary embodiment of the present invention. Specifically, FIG. 5 depicts an exemplary embodiment of the propulsion diagnostics and prognostics manager 416 of FIG. 4. In the depicted embodiment, the propulsion diagnostics and prognostics manager 416 includes a lube system reasoner 502, a fuel system reasoner 504, a performance trending reasoner 506, a rotating component reasoner 508, a startup roll-down reasoner 510, a life usage reasoner 512, and a propulsion diagnostics and prognostics fusion block 514.

Each of these reasoners 302 gathers engine data 306 pertaining to their respective component of the sub-system of the propulsion diagnostics and prognostics manager 416 (e.g., regarding a lube system thereof, a fuel system thereof, performance trending thereof, a rotating component thereof, a start-up and shut-down component thereof, and/or a life usage component thereof, respectively), conducts analysis on such engine data 306, and generates preliminary output thereof. The preliminary output from each of these reasoners 302 is provided to the propulsion diagnostics and prognostics manager fusion block 514, which analyzes the preliminary output and generates manager 202 based at least in part on the preliminary output.

In various embodiments, such a propulsion system manager 202 may include a different combination of these and/or other reasoners 302 and/or fusion blocks 304. In addition, in various embodiments, the various other managers 202 similarly include a plurality of reasoners 302 and corresponding fusion blocks 304. Preferably, each such manager 202 pertains to a different sub-system of the vehicle system, and each reasoner 302 of each manager 202 pertains to a different group of components of the sub-system for the corresponding manager 202 to which the reasoner 302 belongs.

Accordingly, a vehicle health monitoring system is disclosed with an improved architecture. This architecture and system allow for more streamlined and improved support for decision-making pertaining to vehicle systems. As discussed above, this architecture and system can be used in connection with any number of different types of vehicles, vehicle systems, vehicle fleets, and/or other systems and/or combinations thereof.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

We claim:

1. A program product for performing diagnostics on a vehicle system, the program product comprising:

a program configured to at least facilitate performing the diagnostics on the vehicle system, the program comprising:

a plurality of managers, each of the plurality of managers corresponding to a different sub-system of the vehicle system, each of the plurality of managers comprising:

a plurality of reasoners, each of the plurality of reasoners configured to at least facilitate obtaining data and providing preliminary output regarding a different component of the sub-system based at least in part on the data; and a fusion block coupled to the plurality of reasoners, the fusion block configured to at least facilitate receiving the preliminary output and generating manager output based at least in part on the preliminary output, wherein the fusion block is configured to at least facilitate conducting fusion block analysis based at least in part on the preliminary output and generating the manager output based at least in part on the fusion block analysis; and a decision support module coupled to the plurality of managers, the decision support module configured to at least facilitate:

receiving the manager output from the plurality of managers; and providing a decision support output based at least in part on the manager output, wherein the decision support module is configured to at least facilitate performing decision support analysis based at least in part on the manager output and generating the decision support output based at least in part on the decision support analysis; and a computer-readable signal-bearing media bearing the program.

2. The program product of claim 1, wherein:

each of the plurality of reasoners is further configured to at least facilitate conducting reasoner analysis based at least in part on the data; and the preliminary output is based at least in part on the reasoner analysis.

3. The program product of claim 1, wherein:

the program further comprises a plurality of enterprises, each of the plurality of enterprises configured to generate an enterprise output; and the decision support module is further configured to at least facilitate:

receiving the enterprise output from at least one of the plurality of enterprises; and performing the decision support analysis also based at least in part on the enterprise output.

4. The program product of claim 3, wherein the program further comprises:

an enterprise service bus coupled to the plurality of enterprises and the decision support module and configured to at least facilitate flow of the enterprise output to the decision support module and to receive the decision support output from the decision support module; and a plurality of interfaces coupled to the enterprise service bus, the decision support module, and the plurality of enterprises and configured to at least facilitate flow of the decision support output to the enterprise service bus and flow of the enterprise output to the decision support module.

5. The program product of claim 4, wherein the program further comprises:

a diagnostic network coupled to the enterprise service bus and configured to receive the decision support output therefrom; and a presentation layer coupled to the diagnostic network and configured to receive the decision support output therefrom.

6. A computer system for performing diagnostics on a vehicle system, the computer system comprising:

a processor;

a memory coupled to the processor; and a program residing in the memory and configured to be executed by the processor, the program configured to at least facilitate performing the diagnostics on the vehicle system, the program comprising:

a plurality of managers, each of the plurality of managers corresponding to a different sub-system of the vehicle system, each of the plurality of managers comprising:

a plurality of reasoners, each of the plurality of reasoners configured to at least facilitate obtaining data and providing preliminary output regarding a different component of the sub-system based at least in part on the data; and a fusion block coupled to the plurality of reasoners, the fusion block configured to at least facilitate receiving the preliminary output and generating manager output based at least in part on the preliminary output; and a decision support module coupled to the plurality of managers, the decision support module configured to at least facilitate:

receiving the manager output from the plurality of managers; and providing a decision support output based at least in part on the manager output.

7. The computer system of claim 6, wherein:

each of the plurality of reasoners is further configured to at least facilitate conducting reasoner analysis based at least in part on the data; and the preliminary output is based at least in part on the reasoner analysis.

8. The computer system of claim 7, wherein:

the fusion block is configured to at least facilitate conducting fusion block analysis based at least in part on the preliminary output and generating the manager output based at least in part on the fusion block analysis; and the decision support module is configured to at least facilitate performing decision support analysis based at least in part on the manager output and generating the decision support output based at least in part on the decision support analysis.

9. The computer system of claim 8, wherein:

the program further comprises a plurality of enterprises, each of the plurality of enterprises configured to generate an enterprise output; and the decision support module is further configured to at least facilitate:

receiving the enterprise output from at least one of the plurality of enterprises; and performing the decision support analysis also based at least in part on the enterprise output.

10. The computer system of claim 9, wherein the program further comprises:

an enterprise service bus coupled to the plurality of enterprises and the decision support module and configured to at least facilitate flow of the enterprise output to the decision support module and to receive the decision support output from the decision support module; and a plurality of interfaces coupled to the enterprise service bus, the decision support module, and the plurality of enterprises and configured to at least facilitate flow of the decision support output to the enterprise service bus and flow of the enterprise output to the decision support module.

11. The computer system of claim 10, wherein the program further comprises:

a diagnostic network coupled to the enterprise service bus and configured to receive the decision support output therefrom; and a presentation layer coupled to the diagnostic network and configured to receive the decision support output therefrom.

* * * * *